United States Patent
Shiobara

(10) Patent No.: US 9,917,461 B2
(45) Date of Patent: Mar. 13, 2018

(54) BATTERY UNIT, OVERCURRENT CONTROL METHOD, AND COMPUTER PROGRAM FOR THE SAME

(71) Applicant: ELIIY POWER CO., LTD., Tokyo (JP)

(72) Inventor: Syunsuke Shiobara, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 91 days.

(21) Appl. No.: 15/037,531

(22) PCT Filed: Nov. 18, 2014

(86) PCT No.: PCT/JP2014/080453
§ 371 (c)(1),
(2) Date: May 18, 2016

(87) PCT Pub. No.: WO2015/076243
PCT Pub. Date: May 28, 2015

(65) Prior Publication Data
US 2016/0301232 A1    Oct. 13, 2016

(30) Foreign Application Priority Data

Nov. 19, 2013 (JP) ................. 2013-238862

(51) Int. Cl.
*H02J 7/00* (2006.01)
*H02J 13/00* (2006.01)

(52) U.S. Cl.
CPC .......... *H02J 7/0068* (2013.01); *H02J 7/0021* (2013.01); *H02J 7/0029* (2013.01); *H02J 13/0075* (2013.01); *H02J 2007/0039* (2013.01)

(58) Field of Classification Search
CPC ...... H02J 7/0021; H02J 7/0029; H02J 7/0068; H02J 2007/0039
USPC .......................... 320/112, 134, 163
See application file for complete search history.

(56) References Cited

U.S. PATENT DOCUMENTS

2009/0208821 A1    8/2009  Kosugi et al.
2010/0253285 A1*   10/2010 Takahashi ............. H02J 7/0006
                                                    320/118
2013/0293198 A1    11/2013 Nakashima et al.

FOREIGN PATENT DOCUMENTS

| EP | 1837944 A2 | 9/2007 |
| EP | 2653877 A1 | 10/2013 |
| JP | 05327244 | 12/1993 |
| JP | 2010029015 | 2/2010 |
| JP | 2012085461 | 4/2012 |
| JP | 2012205384 | 10/2012 |

(Continued)

*Primary Examiner* — Edward Tso
*Assistant Examiner* — Aaron Piggush
(74) *Attorney, Agent, or Firm* — BainwoodHuang

(57) ABSTRACT

Techniques effectively prevent an overcurrent from occurring in a system comprising assembled batteries connected in parallel to a power supply line, when a given assembled battery is connected to the power supply line. Multiple battery units are each configured such that they can be connected to a power supply line. Each battery unit includes a battery cell group configured including multiple battery cells, a switching unit arranged between the power supply line and the battery cell group so as to control a current that flows between the power supply line and the battery cell group, and a control unit that controls the switching unit.

8 Claims, 11 Drawing Sheets

(56) References Cited

FOREIGN PATENT DOCUMENTS

| JP | 2012205410 | | 10/2012 |
|----|------------|----|---------|
| WO | 2012043723 | A1 | 4/2012 |

* cited by examiner

BATTERY UNIT, OVERCURRENT CONTROL METHOD, AND COMPUTER PROGRAM FOR THE SAME

TECHNICAL FIELD

The present invention relates to a battery unit that is capable of protecting its circuit from being damaged due to the occurrence of an overcurrent, an overcurrent control method, and a computer program thereof.

BACKGROUND ART

Known examples of applications of a secondary battery include: an electric power storage system; and a power supply such as an electric vehicle power supply system for supplying a large amount of electric power. In particular, a lithium ion battery has advantages such as high energy density, high input/output density, and a long cycle life, as compared with other kinds of secondary batteries. From the viewpoint of such advantages, it is anticipated that such a lithium ion battery will be applied to such a power supply for supplying a large amount of electric power.

In such an application as a secondary battery for a power supply for supplying a large amount of electric power, the secondary battery is operated as an assembled battery (which is also referred to as a "battery module" or a "module battery") comprising multiple cells (electric cell). It is conceivable that, in order to allow such an assembled battery to supply a large amount of electric power, the assembled battery preferably has a configuration in which series cell groups each comprising multiple cells connected in series are connected in parallel. This is because, by adjusting the number of cells connected in series, such an arrangement allows the voltage of such an assembled battery to be optimized in a simple manner. In addition, by adjusting the number of cells (series cell groups) connected in parallel, such an arrangement allows the current capacity of such an assembled battery to be optimized in a simple manner.

With such a parallel arrangement comprising such series cell groups, the currents that flow through the respective series cell groups are not necessarily equal to each other. For example, there can be a difference between the currents that flow through the respective series cell groups due to individual differences in the cell characteristics (including degradation in the cell characteristics). Such individual differences in the cell characteristics cannot be completely removed in the manufacturing process. Furthermore, there can be a difference between currents that flow through the respective series cell groups due to a difference in the ambient temperature between the cells. In addition, in some applications, such a difference in the cell ambient temperature is manifested due to the cell layout and due to environmental conditions around the cells such as exposure to solar radiation. In a case in which such a battery system is configured to have a large scale, it is difficult to perform a temperature control operation so as to provide a uniform ambient temperature over all the cells even if air conditioning is performed so as to control the ambient temperature of a housing that houses such an assembled battery.

In order to solve such a problem, a technique is known, which is employed in an assembled battery having a parallel arrangement of series cell groups in order to control the current that flows through each series cell group with high system reliability and with low costs (see Patent document 1, for example).

Furthermore, when a voltage equalizing operation is sequentially performed for multiple batteries, after a large majority of the batteries have been subjected to the voltage equalizing operation, i.e., before only a small minority of batteries have not been subjected to the voltage equalizing operation, in some cases, a problem occurs in the voltage equalization operation for the remaining batteries. For example, in some cases, there is a voltage difference between the batteries that have been subjected to the voltage equalizing operation and the remaining batteries that have not been subjected to the voltage equalizing operation. In this case, when the remaining batteries are directly connected to the battery system so as to perform the voltage equalizing operation, the voltage difference leads to a current flowing between the batteries. In particular, in a stage in which the number of remaining batteries that have not been subjected to the voltage equalizing operation is small, a current flow is concentrated in this small number of remaining batteries, leading to an undesired excessively large current.

In order to solve such a problem, a battery set control system is known, which provides an appropriate operation for removing the voltage difference when multiple battery units to be controlled are connected in parallel (see Patent document 2, for example).

In a case in which the aforementioned voltage equalizing method is employed for a parallel arrangement in which multiple batteries are connected in parallel, there is a difference in the charge/discharge current between a case in which voltage difference compensation is performed between a pair of batteries and a case in which voltage difference compensation is performed between a number of batteries and a single battery. This is due to the internal resistance of each battery and the like. As described above, in a case in which the same voltage equalizing operation is performed giving no consideration to the number of batteries, such an arrangement leads to a problem. For example, in a case in which a low threshold voltage difference is set for the batteries mutually connected to each other, such an arrangement requires a long time period until all the batteries output a uniform voltage. Conversely, in a case in which a high threshold voltage difference is set for the batteries mutually connected to each other, in some cases, in the last connection step or in a connection step in the vicinity of the last connection step, an undesired excessively large current flows through a particular battery thus connected in such a step.

In order to solve such a problem, a battery set control system is known which is capable of executing an appropriate voltage equalizing operation giving consideration to the number of batteries to be subjected to the voltage equalizing (see Patent document 3, for example).

CITATION LIST

Patent Literature

[Patent Document 1]
  Japanese Patent Application Laid Open No. 2010-29015
[Patent Document 2]
  Japanese Patent Application Laid Open No. 2012-205410
[Patent Document 3]
  Japanese Patent Application Laid Open No. 2012-205384

SUMMARY OF INVENTION

Technical Problem

As described above, in a case of employing such an assembled battery, it is important to perform a voltage equalizing operation giving consideration to a difference in current or voltage between the cells that form the assembled battery. However, even with an arrangement that supports such an appropriate operation, a problem remains, which is not described in the aforementioned documents, and which has not been described previously.

Specifically, in a case in which, in a maintenance step or the like, at least one assembled battery is detached from multiple assembled batteries connected in parallel to a power supply line, and the assembled battery thus detached is connected again, in some cases, an overcurrent occurs, leading to damage occurring in circuit elements. Also, in a case in which a given assembled battery is connected to the power supply line in a state in which the power supply source is shut down, in some cases, an overcurrent flows through a floating capacitor that occurs between the power supply line and the ground, leading to damage occurring in circuit elements that form the battery unit.

Accordingly, the present invention has been made in order to solve the aforementioned problems. Specifically, it is a purpose of the present invention to provide a battery unit, an overcurrent control method, and an overcurrent control program, for effectively preventing an overcurrent that can occur in a system in which assembled batteries are connected in parallel to a power supply line when a given assembled battery is connected to the power supply line.

Solution of Problem

The present inventor proposes the following arrangements in order to solve the aforementioned problems.

(1) The present invention proposes a battery unit configured so as to allow multiple battery units to be connected to a power supply line, the battery unit comprising: a battery cell group comprising multiple battery cells; a switching unit arranged between the power supply line and the battery cell group so as to control a current that flows between the power supply line and the battery cell group; and a control unit that controls the switching unit.

(2) The present invention proposes the battery unit described in (1), further comprising: a first detection unit that detects an electric potential at the power supply line; and a second detection unit that detects an electric potential at the battery cell group, wherein the switching unit switches a path between a normal path and a resistance path including a protection resistor that provides the resistance path with a higher resistance value than that of the normal path, and wherein, when the battery unit is connected to the power supply line, the control unit controls the switching unit so as to connect the battery cell group to the power supply line via the resistance path until a voltage difference detected by the first detection unit and the second detection unit becomes a predetermined voltage difference.

(3) The present invention proposes the battery unit described in (1), further comprising: a first detection unit that detects an electric potential at the power supply line; and a second detection unit that detects an electric potential at the battery cell group, wherein the switching unit switches a path between a normal path, a first resistance path including a first protection resistor that provides the first resistance path with a higher resistance value than that of the normal path, and a second resistance path including a second protection resistor having a higher resistance than that of the first protection resistor, wherein, when the battery unit is connected to the power supply line, the control unit controls the switching unit so as to connect the battery cell group to the power supply line via the second resistance path until a voltage difference detected by the first detection unit and the second detection unit becomes a first predetermined voltage difference, and wherein the control unit controls the switching unit so as to connect the battery cell group to the power supply line via the first resistance path until the voltage difference thus detected becomes a second predetermined voltage difference that is smaller than the first voltage difference.

(4) The present invention proposes the battery unit described in (1) further comprising: a first detection unit that detects an electric potential at the power supply line; and a second detection unit that detects an electric potential at the battery cell group, wherein the switching unit switches a path between a normal path and a resistance path including a protection resistor that provides the resistance path with a higher resistance value than that of the normal path, and wherein, when a power supply source suspends a supply of power, the control unit controls the switching unit so as to connect the battery cell group to the power supply line via the resistance path until a voltage difference detected by the first detection unit and the second detection unit becomes a predetermined voltage difference.

(5) The present invention proposes an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line, and wherein the overcurrent control method comprises: a first step in which the control unit detects an electric potential at the power supply line; a second step in which the control unit detects an electric potential at the battery cell group; a third step in which the switching unit is controlled to switch a path between a normal path and a resistance path including a protection resistor that provides the resistance path with a higher resistance value than that of the normal path, such that, when the battery unit is connected to the power supply line, the battery cell group is connected to the power supply line via the resistance path until a voltage difference detected in the first step and the second step becomes a predetermined voltage difference; and a fourth step in which, when the voltage difference detected in the first step and the second step becomes equal to or smaller than a predetermined voltage difference, the control unit controls the switching unit so as to connect the battery cell group to the power supply line via the normal path.

(6) The present invention proposes an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line, and wherein the overcurrent control method comprises: a first step in which the control unit detects an electric potential at the power supply line; a second step in which the control unit detects an electric potential at the battery cell group; a third step in which the switching unit is controlled to switch a path between a normal path, a first resistance path including a first protection resistor that provides the first resistance path with a higher resistance value than that of the normal path, and a second resistance path including a second protection resistor having a higher resistance than that of the first protection resistor, such that, when the battery unit is connected to the power supply line, the battery cell group is connected to the power supply line via the second resistance path until a voltage difference detected in the first step and the second step becomes a first predetermined voltage difference; and a fourth step in which the switching unit is controlled so as to connect the battery cell group to the power supply line via the first resistance path until the voltage difference thus detected becomes a second predetermined voltage difference that is smaller than the first voltage difference.

(7) The present invention proposes an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line in a case in which a power supply source suspends a supply of power, and wherein the overcurrent control method comprises: a first step in which the control unit detects an electric potential at the power supply line; a second step in which the control unit detects an electric potential at the battery cell group; and a third step in which the switching unit is controlled to switch a path between a normal path and a resistance path including a protection resistor that provides the resistance path with a higher resistance value than that of the normal path, such that the battery cell group is connected to the power supply line via the resistance path until a voltage difference detected in the first step and the second step becomes a predetermined voltage difference.

(8) The present invention proposes a computer program configured to instruct a computer to execute an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line, and wherein the overcurrent control method comprises: a first step in which the control unit detects an electric potential at the power supply line; a second step in which the control unit detects an electric potential at the battery cell group; a third step in which the switching unit is controlled to switch a path between a normal path and a resistance path including a protection resistor that provides the resistance path with a higher resistance value than that of the normal path, such that, when the battery unit is connected to the power supply line, the battery cell group is connected to the power supply line via the resistance path until a voltage difference detected in the first step and the second step becomes a predetermined voltage difference; and a fourth step in which, when the voltage difference detected in the first step and the second step becomes equal to or smaller than a predetermined voltage difference, the control unit controls the switching unit so as to connect the battery cell group to the power supply line via the normal path.

(9) The present invention proposes a computer program configured to instruct a computer to execute an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line, and wherein the overcurrent control method comprises: a first step in which the control unit detects an electric potential at the power supply line; a second step in which the control unit detects an electric potential at the battery cell group; a third step in which the switching unit is controlled to switch a path between a normal path, a first resistance path including a first protection resistor that provides the first resistance path with a higher resistance value than that of the normal path, and a second resistance path including a second protection resistor having a higher resistance than that of the first protection resistor, such that, when the battery unit is connected to the power supply line, the battery cell group is connected to the power supply line via the second resistance path until a voltage difference detected in the first step and the second step becomes a first predetermined voltage difference; and a fourth step in which the switching unit is controlled so as to connect the battery cell group to the power supply line via the first resistance path until the voltage difference thus detected becomes a second predetermined voltage difference that is smaller than the first voltage difference.

(10) The present invention proposes a computer program configured to instruct a computer to execute an overcurrent control method employed in multiple battery units each configured to be connected to a power supply line, and each comprising a battery cell group that comprises multiple batteries, a switching unit, and a control unit, wherein the overcurrent control method is performed when the battery unit is connected to the power supply line in a case in which a power supply source suspends a supply of power, and wherein the overcurrent control method comprises: a first step in which the control unit detects an electric potential at the power supply line; a second step in which the control unit detects an electric potential at the battery cell group; and a third step in which the switching unit is controlled to switch a path between a normal path and a resistance path including a protection resistor that provides the resistance path with a higher resistance value than that of the normal path, such that the battery cell group is connected to the power supply line via the resistance path until a voltage difference detected in the first step and the second step becomes a predetermined voltage difference.

Advantageous Effects of Invention

With the present invention, such an arrangement provides an advantage of allowing a given battery unit to be connected as desired to a power supply line while protecting its circuit elements from being damaged due to the occurrence of an overcurrent.

DESCRIPTION OF EMBODIMENTS

Detailed description will be made below regarding an embodiment of the present invention with reference to the drawings.

It should be noted that each component in the present embodiment can be replaced as appropriate by another existing component. Also, various kinds of variations may be made including various kinds of combinations with different existing components. Accordingly, description of the present embodiment is by no means intended to restrict the technical scope of the present invention described in the appended claims.

First Embodiment

Figure 1:
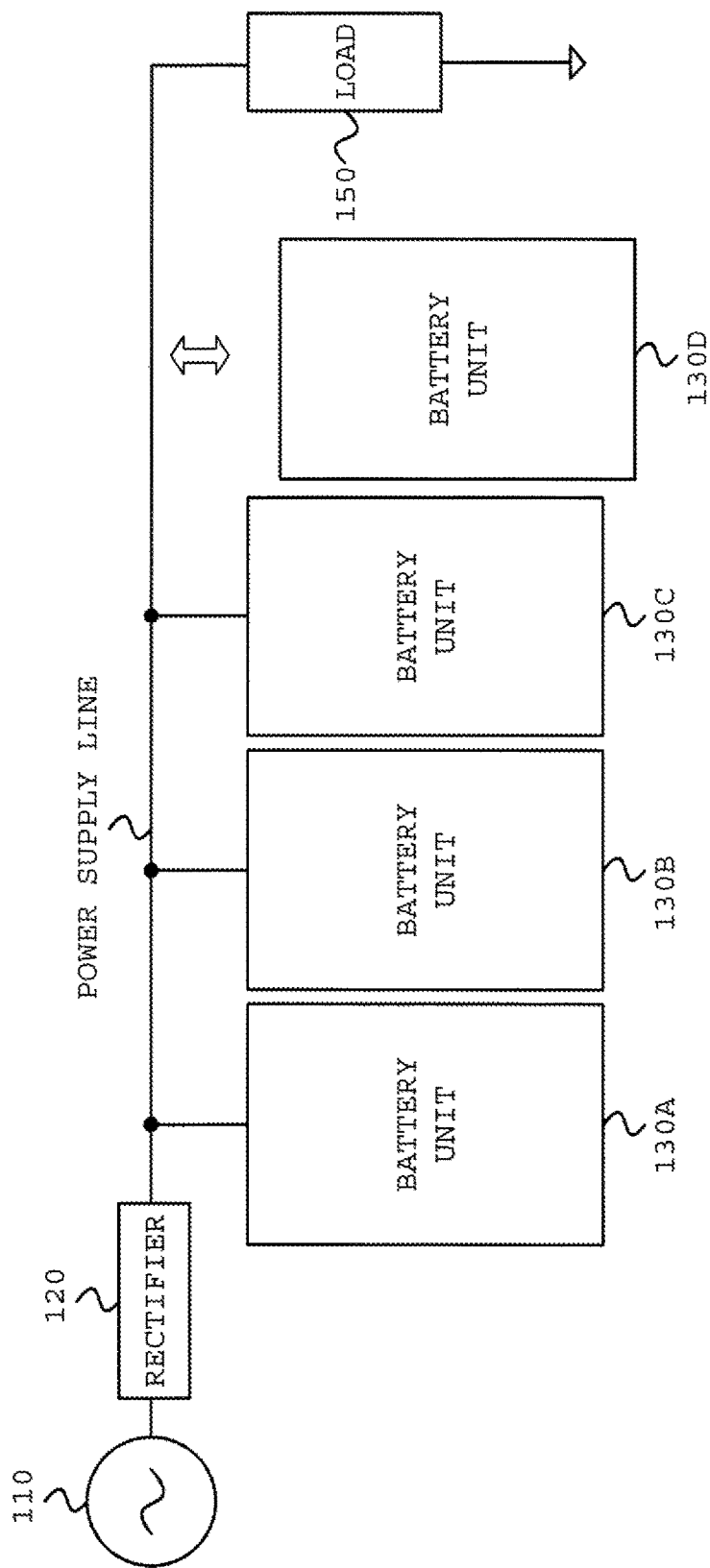
FIG. 1 is a diagram showing a configuration of a battery system employing battery units according to a first embodiment of the present invention.

Description will be made regarding a first embodiment of the present invention with reference to FIGS. 1 through 4.
[Configuration of a Battery System]
As shown in FIG. 1, a battery system employing battery units according to the present embodiment includes a power supply source 110, a rectifier 120, battery units 130A through 130D, a load 150 (e.g., DC load, power converter such as an inverter or the like, etc.), and a power supply line.

The power supply source 110 may be configured as a commercial power supply or a solar panel or the like using natural energy. The power supply source 110 supplies electric power to the load 150 and the battery units 130A through 130D. In order to supply DC electric power to the load 150 and the battery units 130A through 130D, the rectifier 120 rectifies AC electric power supplied from the power supply source 110 into DC electric power.

Figure 2:
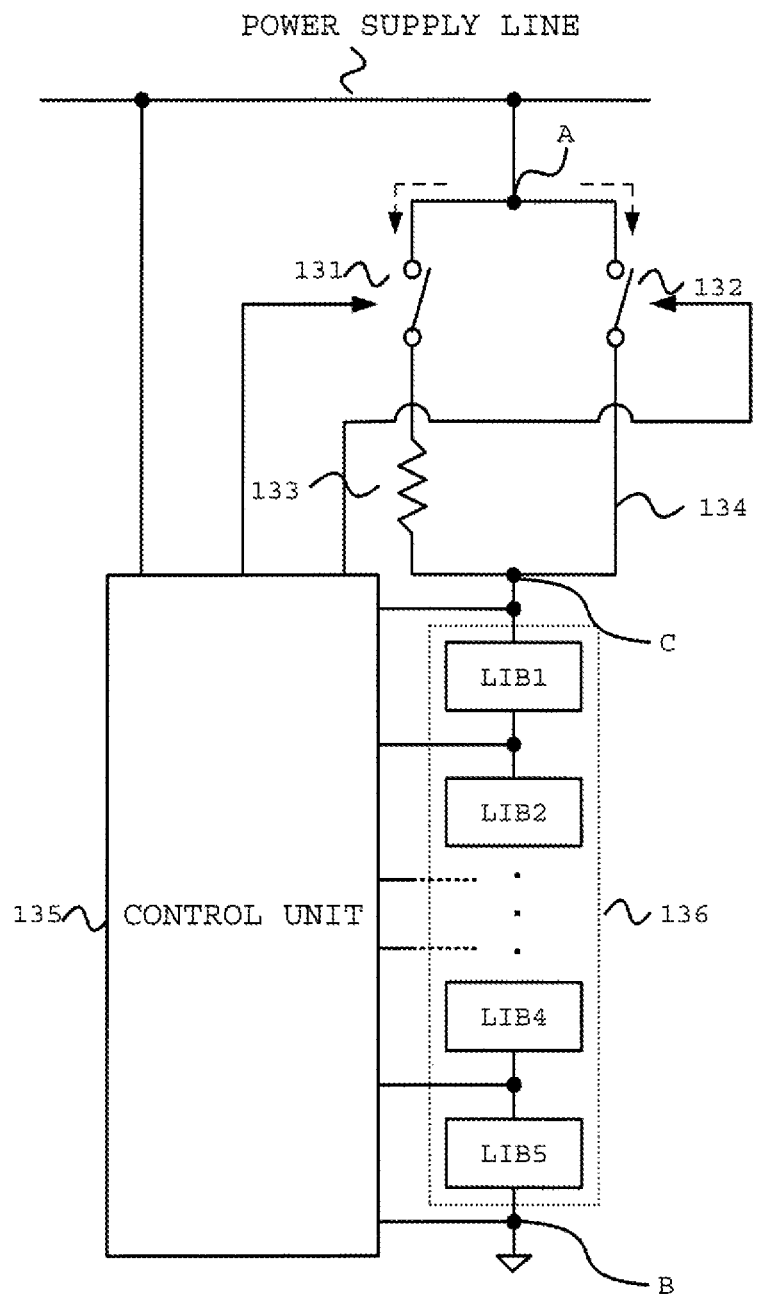
FIG. 2 is a diagram showing a configuration of a battery unit according to the first embodiment of the present invention.

In a case in which the power supply source 110 suspends the supply of electric power or in a case in which the amount of electric power supplied from the power supply source 110 is lower than the amount of electric power required by the load 150, the battery units 130A through 130D each function as a backup power supply, i.e., each supply electric power to the load 150. It should be noted that detailed description will be made later regarding the battery units 130A through 130D.
[Configuration of the Battery Unit]
As shown in FIG. 2, the battery units 130A through 130D according to the present embodiment each comprise switching elements 131 and 132, a resistance path 133, a normal path 134, a control unit 135, and a battery cell group 136. It should be noted that the present embodiment is made in order to support a case in which, in a maintenance step or the like, at least one battery unit is detached from multiple battery units connected in parallel to a power supply line, and the battery unit thus detached is connected again to the power supply line.

The switching elements 131 and 132 switch a connection path that connects the power supply line and the battery cell group 136 between the resistance path 133 and the normal path 134, according to a control signal received from the control unit 135 described later. It should be noted that the switching elements 131 and 132 may each be configured as a relay, a power MOSFET (metal oxide semiconductor field effect transistor), a bipolar transistor, an IGBT (Insulator gated Bipolar Transistor), or the like.

In a case in which the switching elements 131 and 132 are each configured as a power MOSFET, it is conceivable that, by supplying a current control signal to the gate of each power MOSFET, such an arrangement is capable of adjusting the values of the respective currents that flow through the switching elements 131 and 132. That is to say, by appropriately adjusting the voltage level of the current control signal (i.e., gate voltage to be supplied to each power MOSFET), such an arrangement allows the current value to be controlled.

The resistance path 133 is configured as a path including a resistor that regulates the current value. The resistance value of the resistor may be selected as appropriate according to the current value to be regulated. The normal path 134 does not have a resistor that regulates the current value, and is the path for the normal operation. As described above, the resistance path 133 includes a resistor element. This provides the resistance path 133 with a resistance that is higher than that of the normal path 134. This allows the resistance path 133 to regulate the current value when an excessively large current occurs, and to regulate the voltage value by means of a voltage drop when an excessively large voltage occurs.

The control unit 135 detects the electric potential at the power supply line and the electric potential at the battery cell group. Furthermore, when the battery unit is connected to the power supply line, the control unit 135 controls the switching elements 131 and 132 such that the battery cell group 136 is connected to the power supply line via the resistance path 133 until the voltage difference between the two voltage values thus detected reaches a predetermined voltage difference. It should be noted that detailed description of the configuration will be made later.

Figure 3:
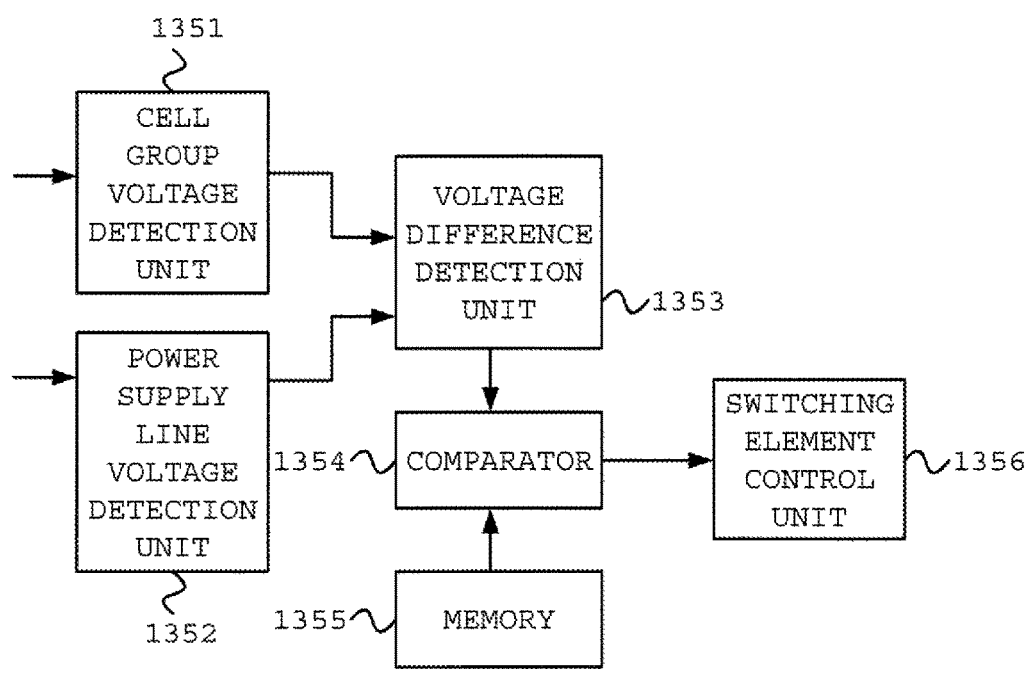
FIG. 3 is a diagram showing a configuration of a control unit included within the battery unit according to the first embodiment of the present invention.

The battery cell group 136 comprises multiple batteries such as lithium ion batteries, nickel hydride batteries, nickel cadmium batteries, or the like, connected in series. The battery cell group 136 is configured in order to provide a voltage and a current corresponding to the electric power required for the load 150. Thus, the number of component batteries that form the battery cell group 136, the number of battery packs each configured as a combination of the component batteries, and the like, may be designed as appropriate according to the system specifications.
[Configuration of the Control Unit]
As shown in FIG. 3, the control unit 135 according to the present embodiment includes a cell group voltage detection unit 1351, a power supply line voltage detection unit 1352, a voltage difference detection unit 1353, a comparator 1354, a memory 1355, and a switching element control unit 1356.

The cell group voltage detection unit 1351 is connected to the battery cell group 136, so as to detect the voltage value at the battery cell group 136. The power supply line voltage detection unit 1352 is connected to the power supply line, so as to detect the voltage value at the power supply line. The voltage difference detection unit 1353 is connected to the cell group voltage detection unit 1351 and the power supply line voltage detection unit 1352, so as to detect the voltage difference between the voltage value detected by the cell group voltage detection unit 1351 and the voltage value detected by the power supply line voltage detection unit 1352.

The comparator 1354 is connected to the voltage difference detection unit 1353, the memory 1355, and the switching element control unit 1356. The comparator 1354 compares the voltage difference detected by the voltage difference detection unit 1353 with a predetermined voltage difference stored in the memory 1355. The comparator 1354 outputs a comparison result signal to the switching element control unit 1356. The switching element control unit 1356 outputs a gate signal to the switching element 131 so as to turn on the switching element 131 until the voltage difference thus detected reaches the predetermined voltage difference. In this state, the battery cell group 136 is connected to the power supply line via the resistance path 133. When the voltage difference thus detected becomes equal to or smaller than the predetermined voltage difference, the comparator 1354 outputs a gate signal to the switching element 132 so as to turn on the switching element 132. In this state, the battery cell group 136 is connected to the power supply line via the normal path 134.

[Operation of the Battery Unit]

Figure 4:
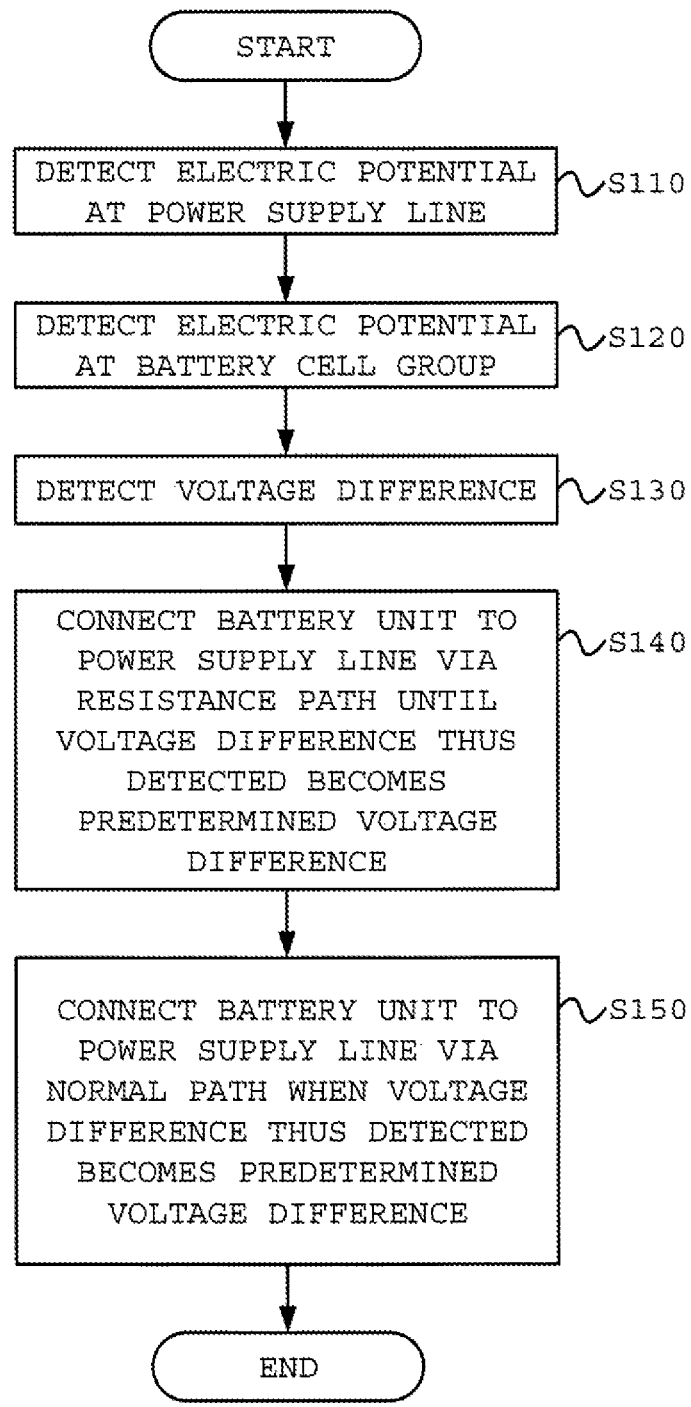
FIG. 4 is a diagram showing the operation of the battery unit according to the first embodiment of the present invention.

Description will be made with reference to FIG. 4 regarding the operation of each of the battery units 130A through 130D according to the present embodiment.

In a state in which electric power is not supplied to the battery unit, the switching elements 131 and 132 are all turned off.

An external terminal of the battery unit to be connected to the power supply line (external terminal A connected to one end of the switching element 131 and one end of the switching element 132 shown in FIG. 2) is connected to a terminal B (negative electrode side of a battery cell LIB5, which is the cell on the lower end of the battery cell group 136 shown in FIG. 2) via an unshown pull-down resistor having a high resistance. The terminal B is set to a reference electric potential (common electric potential). Thus, when the battery unit is not connected to the power supply line, the electric potential level of the power supply line side of the switching elements (external terminal A) is set to the common electric potential level.

On the other hand, when the battery unit is connected to the power supply line, the power supply line side of the switching elements (terminal A) is set to the same electric potential level as that of the power supply line. It should be noted that the battery cell group 136 side of the switching elements (terminal C shown in FIG. 2) is set to the same electric potential level as that of the battery voltage of the battery cell regardless of whether or not the battery unit is connected to the power supply line.

When electric power is supplied to the battery unit, the control unit 135 checks the operation of each switching element based on the voltage difference between the terminals A and C. In this operation check, for example, the control unit 135 measures the voltage difference between both ends of each switching element (between the external terminal A side and the terminal C side) in two states, i.e., in an off state in which the corresponding switching element is turned off and in an on state in which the corresponding switching element is turned on. When there is no change in the voltage difference across both ends of the switching element between the off state and the on state, judgement can be made that a short-circuit state has occurred between both ends of the switching element, or that a state has occurred in which no current flows through the switching element when the switching element is turned on.

In this case, the control unit 135 judges that a malfunction has occurred in the switching element. Furthermore, the control unit 135 issues a malfunction notification alert. Alternatively, the control unit 135 generates a signal to be used to perform a malfunction handling operation, and transmits the malfunction handling signal thus generated to an unshown malfunction handling unit. Conversely, when there is a predetermined change in the voltage difference across both ends of the switching element between the off state and the on state, judgement is made that the switching element operates normally.

When the operation check for each switching element ends after the power is supplied to the battery unit, first, the switching element 131 is turned on while the switching element 132 is maintained in the off state. Such a control operation is performed from the viewpoint of safety.

For example, it is conceivable that, before the battery unit is connected to the power supply line, in some cases, the external terminal A of the battery unit is electrically connected to an undesired line that accidentally has a certain electric potential, leading to an undesired flow of overcurrent. Also, it is conceivable that, immediately after the battery unit is connected to the power supply line, an undesired charge current flows to a floating capacitance that occurs on the power supply line.

In order to suppress damage of the circuit elements that form the battery unit from occurring due to such an overcurrent that can occur in such a situation, the on/off state of each switching element is controlled as described above. With such an operation, the overcurrent is received via the resistance path 133 having a high resistance value even if such an overcurrent occurs. Thus, such an arrangement is capable of protecting the internal circuit elements or the like from being damaged. Description will be made below regarding the operation of the battery unit when it is connected to the power supply line after judgement is made in the operation check that each switching element operates normally.

With the control unit 135, when the battery unit is connected to the power supply line, the power supply line voltage detection unit 1352 detects the electric potential at the power supply line (Step S110). Furthermore, the cell group voltage detection unit 1351 detects the electric potential at the battery cell group (Step S120). Moreover, the voltage difference detection unit 1353 detects the voltage difference between the voltage value detected by the cell group voltage detection unit 1351 and the voltage value detected by the power supply line voltage detection unit 1352 (Step S130).

Next, the comparator 1354 compares the voltage difference thus detected by the voltage difference detection unit 1353 with a predetermined voltage difference stored in the memory 1355. The comparator 1354 outputs a comparison result signal, which indicates the comparison result, to the switching element control unit 1356.

Upon receiving the comparison result signal, the switching element control unit 1356 outputs a gate signal to the switching element 131 so as to turn on the switching element 131 until the voltage difference thus detected reaches the predetermined voltage difference. In this state, the battery cell group 136 is connected to the power supply line via the resistance path 133 (Step S140). When the voltage difference thus detected becomes equal to or smaller than the predetermined voltage difference, the switching element control unit 1356 outputs a gate signal to the switching element 132 so as to turn on the switching element 132. In this state, the battery cell group 136 is connected to the power supply line via the normal path 134 (Step S150).

As described above, the present embodiment allows a given battery unit to be connected as desired to the power supply line while protecting its circuit elements from an overcurrent that can occur in a case in which, in a maintenance step or the like, at least one battery unit is detached from multiple battery units connected in parallel to the power supply line, and the battery unit thus detached is connected again to the power supply line.

Second Embodiment

Description will be made regarding a second embodiment of the present invention with reference to FIGS. 5 through 7.

[Configuration of the Battery Unit]

Figure 5:
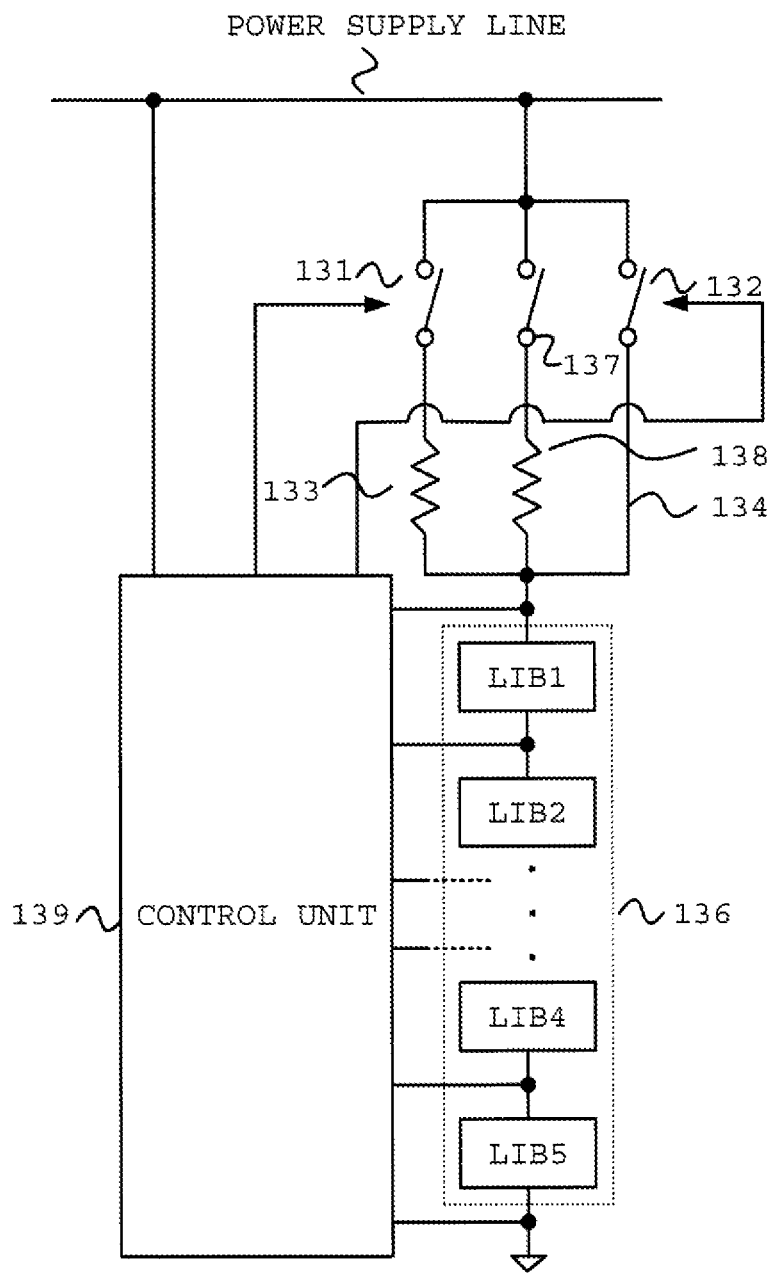
FIG. 5 is a diagram showing a configuration of a battery unit according to a second embodiment of the present invention.

As shown in FIG. 5, a battery unit according to the present embodiment is configured including switching elements 131, 132, 137, a first resistance path 133, a normal path 134, a control unit 139, a battery cell group 136, and a second resistance path 138.

It should be noted that the present embodiment has been made in order to support a case in which, in a maintenance step or the like, at least one battery unit is detached from multiple battery units connected in parallel to the power supply line (130A through 130D shown in FIG. 1), and the battery unit thus detached is connected again to the power supply line. The point of difference between the first embodiment and the second embodiment is that, in the second embodiment, two resistance paths having different respective resistance values are provided. Thus, the battery unit is designed to require only a short time period to provide a voltage difference equilibrium state while protecting its circuit elements from an overcurrent. It should be noted that the components denoted by the same reference symbols as those in the first embodiment provide the same functions as those in the first embodiment. Accordingly, detailed description thereof will be omitted.

The switching element 137 switches a connection path that connects the power supply line and the battery cell group 136 between the first resistance path 133, the second resistance path 138, and the normal path 134, according to a control signal received from the control unit 135 described later.

The first resistance path 133 and the second resistance path 138 are respectively configured as paths that each have different resistances so as to function as a current regulator. For example, the second resistance path 138 is configured to have a higher resistance value than that of the first resistance path 133.

The control unit 139 detects the electric potential at the power supply line and the electric potential at the battery cell group. When the battery unit is connected to the power supply line, the control unit 139 controls the switching elements 131, 132, and 137 so as to connect the battery cell group 136 to the power supply line via the second resistance path 138 until the voltage difference between the two voltages thus detected reaches a first predetermined voltage difference. When the voltage difference between the two voltage values thus detected becomes equal to or smaller than the first predetermined voltage difference, the control unit 139 controls the switching elements 131, 132, and 137 so as to connect the battery cell group 136 to the power supply line via the first resistance path 133. When the voltage difference between the two voltage values thus detected becomes equal to or smaller than a second predetermined voltage difference, the control unit 139 controls the switching elements 131, 132, and 137 so as to connect the battery cell group 136 to the power supply line via the normal path 134. It should be noted that detailed configuration of the control unit 139 will be made later.

[Configuration of the Control Unit]

Figure 6:
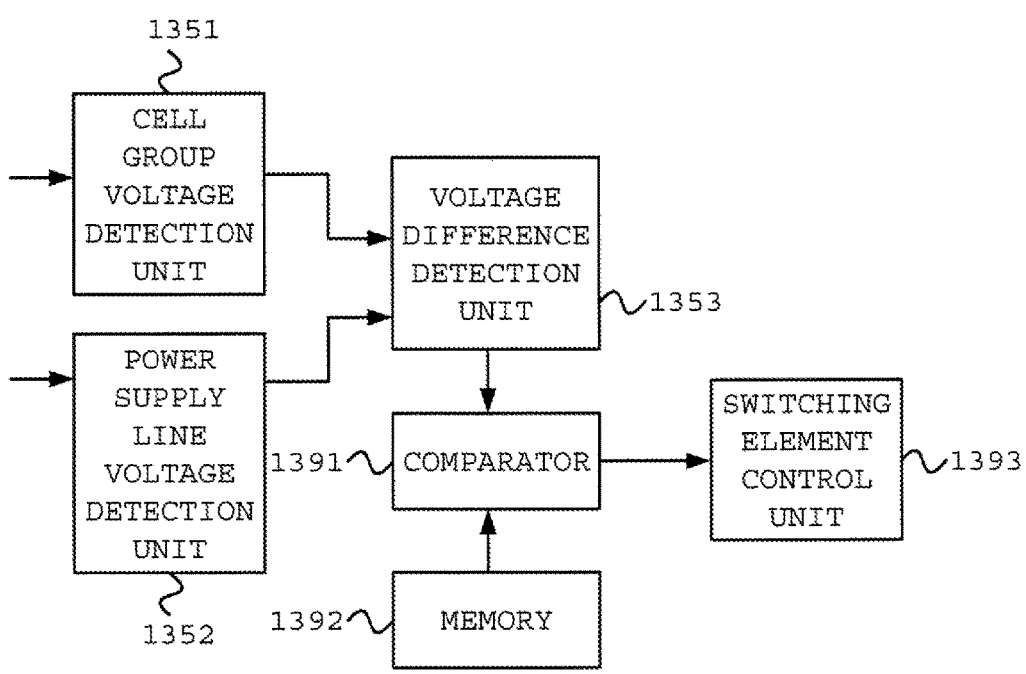
FIG. 6 is a diagram showing a configuration of a control unit included within the battery unit according to the second embodiment of the present invention.
Figure 7:
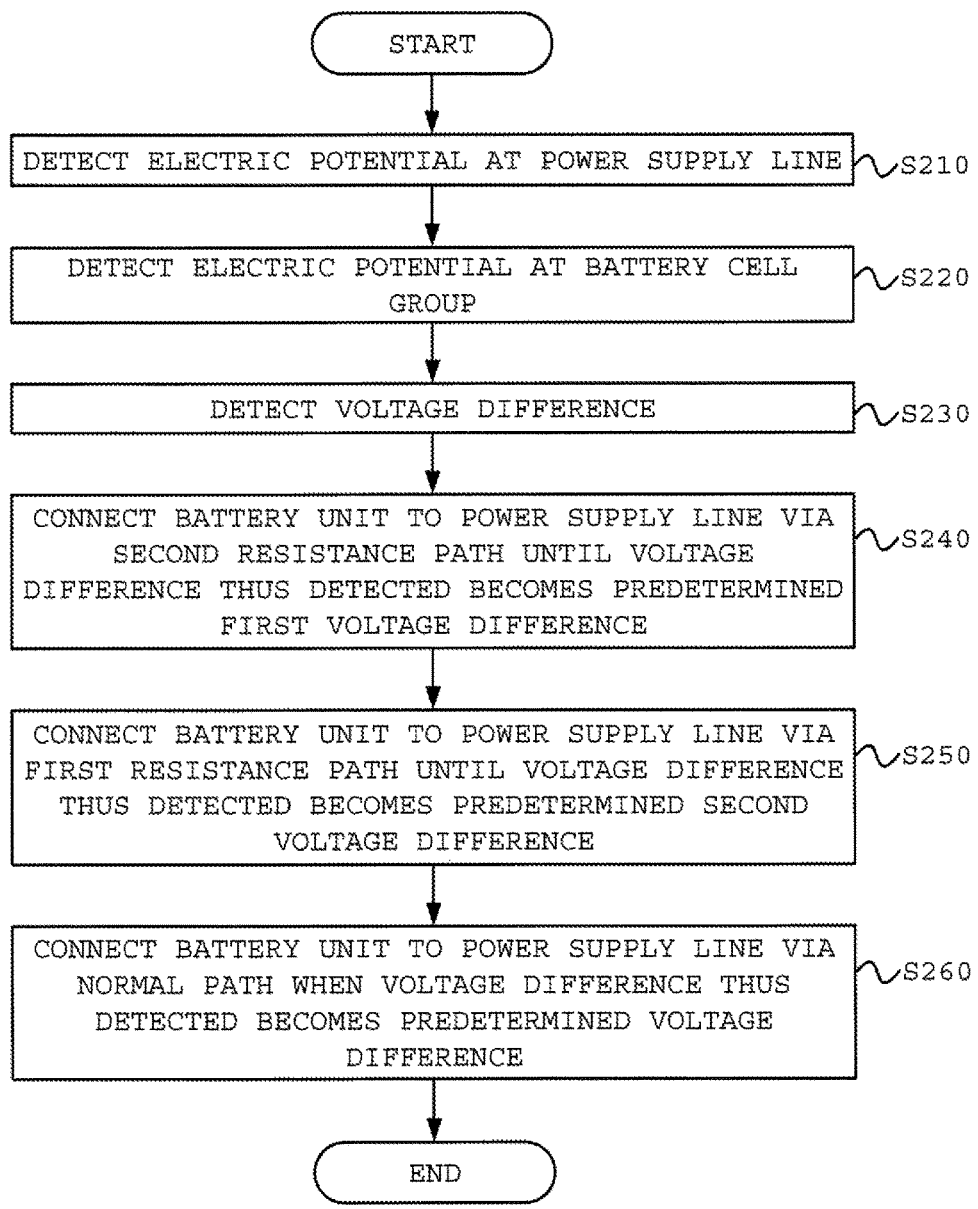
FIG. 7 is a diagram showing the operation of the battery unit according to the second embodiment of the present invention.

As shown in FIG. 6, the control unit according to the present embodiment comprises a cell group voltage detection unit 1351, a power supply line voltage detection unit 1352, a voltage difference detection unit 1353, a comparator 1391, a memory 1392, and a switching element control unit 1393.

The comparator 1391 compares the voltage difference detected by the voltage difference detection unit 1353 with the first predetermined voltage difference stored in the memory 1392. The comparator 1391 outputs a comparison result signal, which indicates the comparison result, to the switching element control unit 1393.

The switching element control unit 1393 outputs a gate signal to the switching element 137 so as to turn on the switching element 137 until the voltage difference thus detected becomes the first predetermined voltage difference. In this state, the battery cell group 136 is connected to the power supply line via the second resistance path 138. Subsequently, when the voltage difference thus detected becomes equal to or smaller than the first predetermined voltage difference, the switching element control unit 1393 turns off the switching element 137, and outputs a gate signal to the switching element 131 so as to turn on the switching element 131. In this state, the battery cell group 136 is connected to the power supply line via the first resistance path 133. Subsequently, when the voltage difference thus detected becomes equal to or smaller than the second predetermined voltage difference stored in the memory 1392, the switching element control unit 1393 outputs a gate signal to the switching element 132 so as to turn on the switching element 132. In this state, the battery cell group 136 is connected to the power supply line via the normal path 134.

[Operation of the Battery Unit]

Description will be made with reference to FIG. 7 regarding the operation of the battery unit according to the present embodiment.

In an initial state in which a given battery unit is not connected to the power supply line, the switching element 137 is turned on, and the switching elements 131 and 132 are each turned off. In this state, the second resistance path 138 having the highest resistance value is selected, in the same way as in the first embodiment described above.

When the battery unit is connected to the power supply line, in the control unit 139, the power supply line voltage detection unit 1352 detects the electric potential at the power supply line (Step S210). Furthermore, the cell group voltage detection unit 1351 detects the electric potential at the battery cell group 136 (Step S220). Moreover, the voltage difference detection unit 1353 detects the voltage difference between the voltage value detected by the cell group voltage detection unit 1351 and the voltage value detected by the power supply line voltage detection unit 1352 (Step S230).

Next, the comparator 1391 compares the voltage difference detected by the voltage difference detection unit 1353 with the first predetermined voltage difference stored in the memory 1392. The comparator 1391 outputs a comparison result signal, which indicates the comparison result, to the switching element control unit 1393.

Next, the switching element control unit 1393 outputs a gate signal to the switching element 137 so as to turn on the switching element 137 until the voltage difference thus detected becomes the first predetermined voltage difference. In this state, the battery cell group 136 is connected to the power supply line via the second resistance path 138 (Step S240).

Subsequently, when the voltage difference thus detected becomes equal to or smaller than the first predetermined voltage difference, the switching element control unit 1393 turns off the switching element 137, and outputs a gate signal to the switching element 131 so as to turn on the switching element 131. In this state, the battery cell group 136 is connected to the power supply line via the first resistance path 133 (Step S250). When the voltage difference becomes equal to or smaller than the second voltage difference, the switching element control unit 1393 outputs a gate signal to the switching element 132 so as to turn on the switching element 132. In this state, the battery cell group 136 is connected to the power supply line via the normal path 134 (Step S260).

As described above, the present embodiment has a configuration including the first resistance path and the second resistance path having different respective resistance values in addition to the normal path such that they are connected in parallel. Such a configuration is effective in a maintenance step, and particularly, when a given battery unit is replaced by another battery unit. For example, before a given battery unit from among multiple battery units is replaced by another battery unit, in some cases, the battery units (mounted battery units) that have been already connected to the power supply line are each in a full-charge state, and the battery unit (new battery unit) to be newly connected to the power supply line in the battery replacement is in a state in which it has hardly any charge. In this case, when the new battery unit is connected to the power supply line, an overcurrent occurs between the mounted battery units and the new battery unit due to a difference in the charge amount. Thus, in the first stage after the new battery unit is connected to the power supply line, they are connected to each other via the second resistance path. In this state, the new battery unit is charged. In a case in which the charging path is fixedly set to the second resistance path having a high resistance value, such an arrangement requires a long time period to charge the new battery unit, which is a problem. In order to solve such a problem, by switching the charging path from the second resistance path to the first resistance path when the voltage difference between the power supply line and the new battery unit reaches a predetermined small level, such an arrangement allows the time period required for charging to be reduced. Thus, with the present embodiment, in a case in which, in a maintenance step or the like, at least one battery unit is detached from multiple battery units connected in parallel to the power supply line, and the battery unit thus detached is connected again to the power supply line, such an arrangement provides the following advantages: a given battery unit can be connected as desired to the power supply line; only a short time period is required to reach a voltage difference equilibrium state; and the circuit elements can be protected from an overcurrent that can occur.

Third Embodiment

Figure 8:
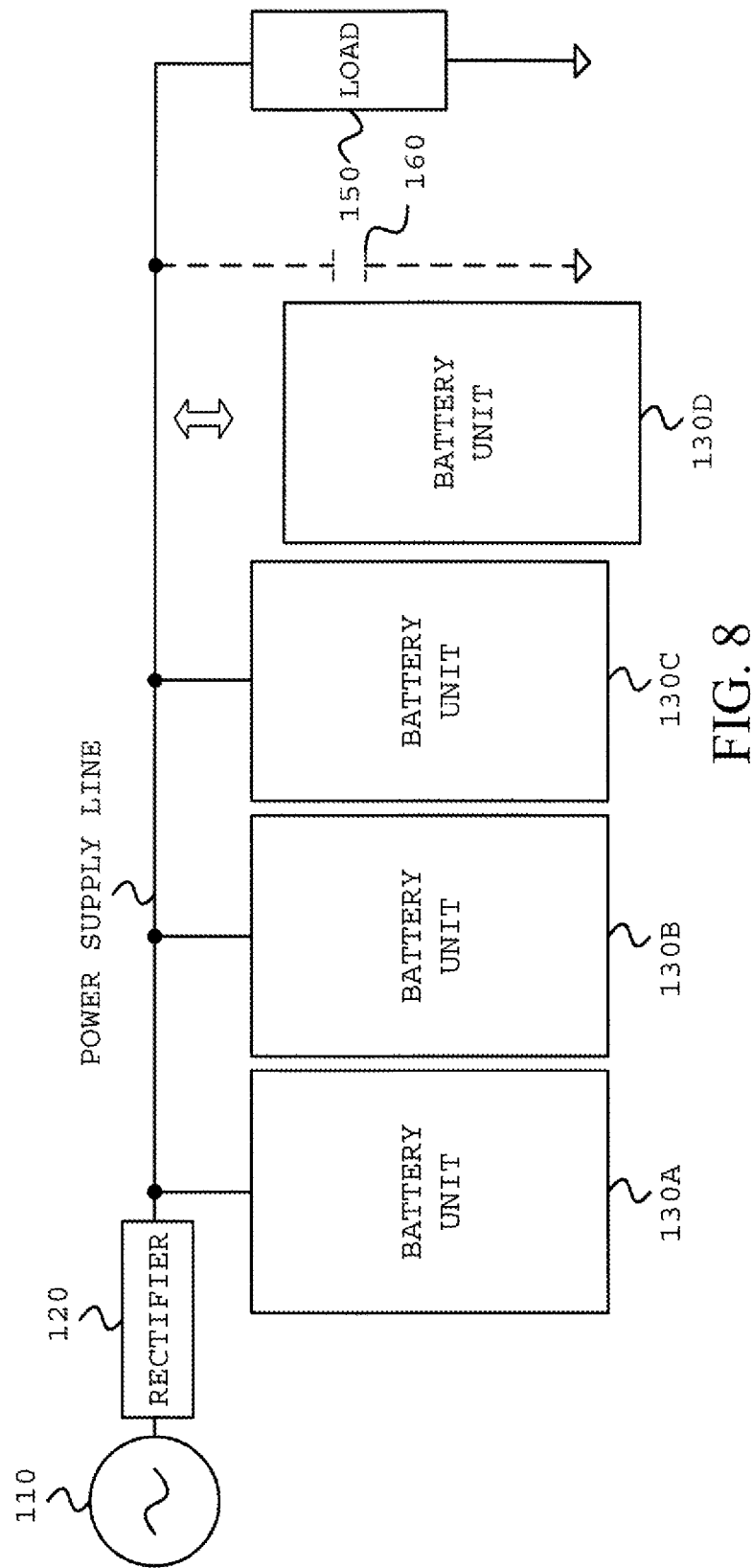
FIG. 8 is a diagram showing a configuration of a battery system employing battery units according to a third embodiment of the present invention.
Figure 9:
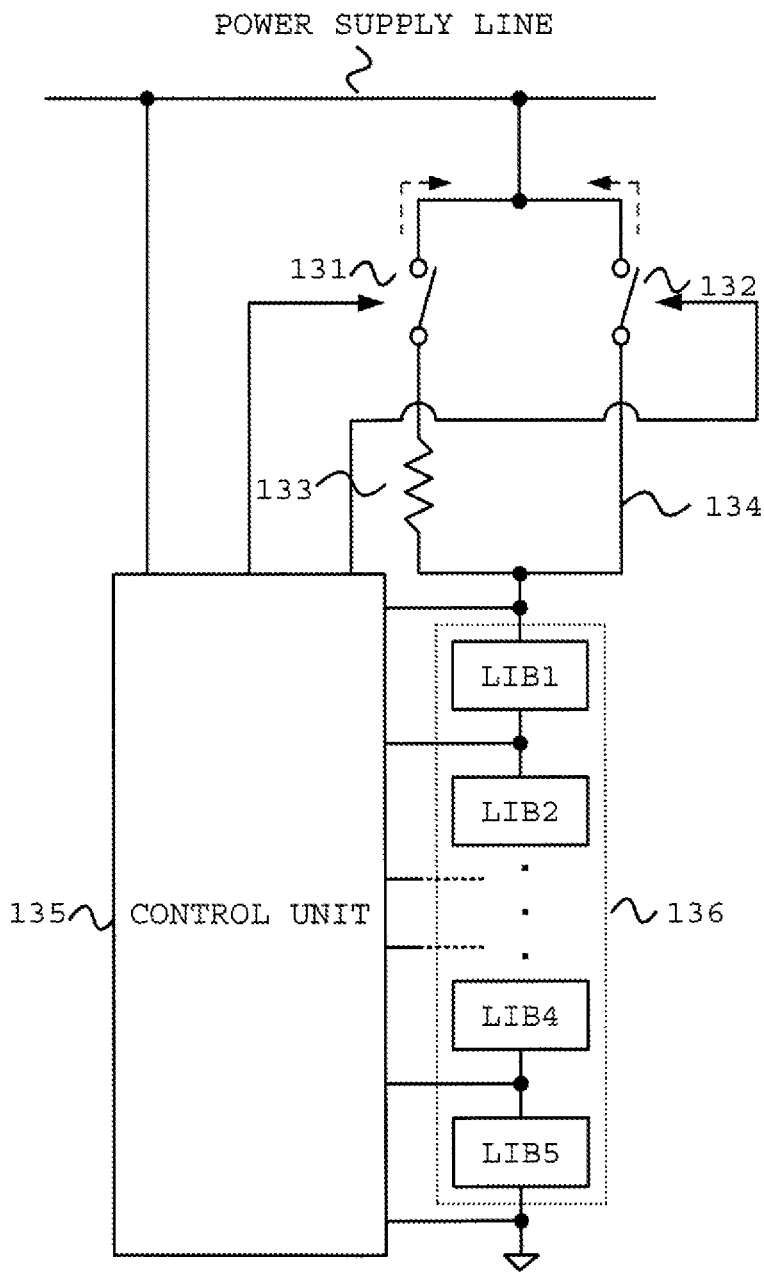
FIG. 9 is a diagram showing a configuration of a battery unit according to the third embodiment of the present invention.

Description will be made regarding a third embodiment of the present invention with reference to FIGS. 8 through 11.
[Configuration of the Battery System]
As shown in FIG. 8, a battery system employing a battery unit according to the present invention is configured including a power supply source 110, a rectifier 120, battery units 130A through 130D, a load 150, a floating capacitance 160, and a power supply line. It should be noted that the components denoted by the same reference symbols as those in the first embodiment provide the same functions as those in the first embodiment. Accordingly, detailed description thereof will be omitted. Here, the floating capacitance 160 is a pseudo-capacitance that occurs during a period in which the current supply to the load 150 is suspended.
[Configuration of the Battery Unit]
As shown in FIG. 9, the battery unit according to the present embodiment is configured including switching elements 131 and 132, a resistance path 133, a normal path 134, a control unit 135, and a battery cell group 136. It should be noted that the present embodiment is made in order to support a case in which, in a maintenance step or the like, when the supply of power from the power supply source 110 is suspended, at least one battery unit is detached from multiple battery units connected in parallel to a power supply line, and the battery unit thus detached is connected again to the power supply line. It should be noted that the components denoted by the same reference symbols as those in the first embodiment provide the same functions as those in the first embodiment. Accordingly, detailed description thereof will be omitted.

Figure 10:
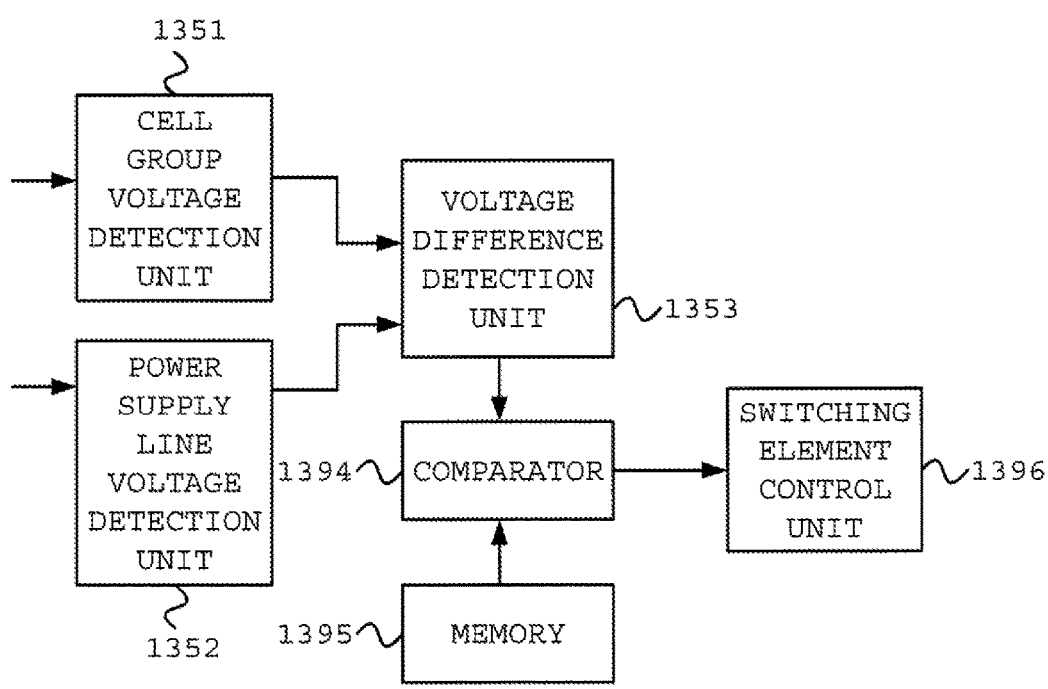
FIG. 10 is a diagram showing a configuration of a control unit included within the battery unit according to the third embodiment of the present invention.

It should be noted that, when a given battery unit is connected to the power supply line as described above, in some cases, an overcurrent flows from the battery unit to the floating capacitance, which is a problem. In order to solve such a problem, as described later in detail, the present embodiment provides a control operation for preventing the occurrence of such an overcurrent.
[Configuration of the Control Unit]
As shown in FIG. 10, the control unit according to the present embodiment includes a cell group voltage detection unit 1351, a power supply line voltage detection unit 1352, a voltage difference detection unit 1353, a comparator 1394, a memory 1395, and a switching element control unit 1396.

The cell group voltage detection unit 1351 detects the voltage value at the battery cell group 136. The power supply line voltage detection unit 1352 detects the voltage value at the power supply line. The voltage difference detection unit 1353 detects the voltage difference between the voltage value detected by the cell group voltage detection unit 1351 and the voltage value detected by the power supply line voltage detection unit 1352. It should be noted that the control unit 135 detects whether or not the system enters a mode in which the supply of power from the power supply source 110 is suspended, based on the voltage value acquired by the power supply line voltage detection unit 1352.

The comparator 1394 compares the voltage difference detected by the voltage difference detection unit 1353 with a predetermined voltage difference stored in the memory 1395. The comparator 1394 outputs a comparison result signal to the switching element control unit 1396. The switching element control unit 1396 outputs a gate signal to the switching element 131 so as to turn on the switching element 131 until the voltage difference thus detected reaches the predetermined voltage difference. In this state, the battery cell group 136 is connected to the power supply line via the resistance path 133. When the voltage difference thus detected becomes equal to or smaller than the predetermined voltage difference, the comparator 1394 outputs a gate signal to the switching element 132 so as to turn on the switching element 132. In this state, the battery cell group 136 is connected to the power supply line via the normal path 134.

[Operation of the Battery Unit]

Figure 11:
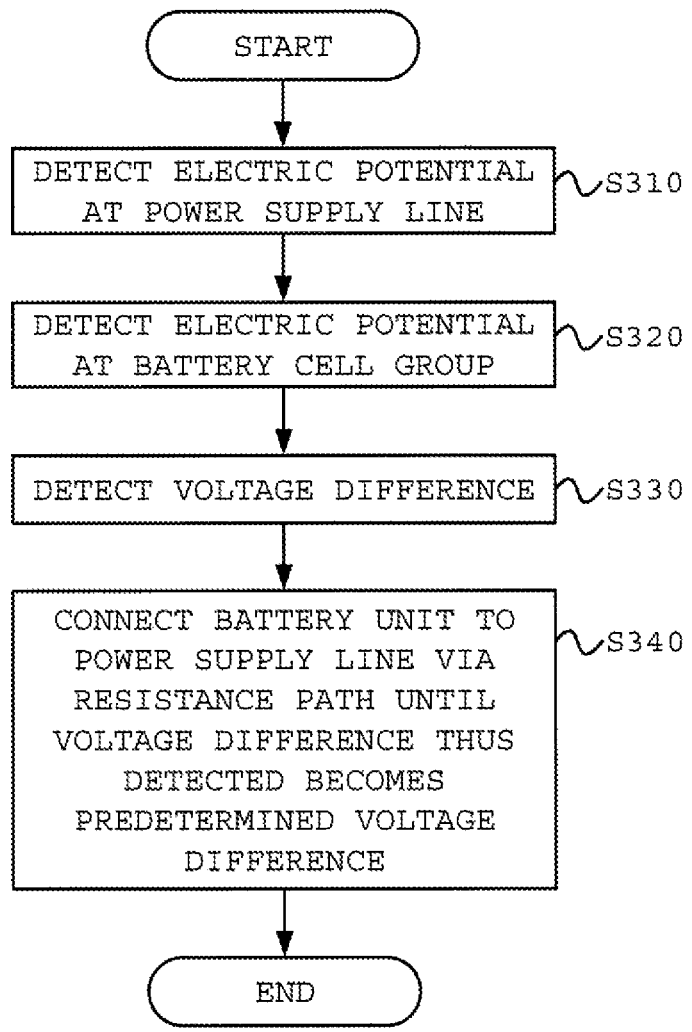
FIG. 11 is a diagram showing the operation of the battery unit according to the third embodiment of the present invention.

Description will be made with reference to FIG. 11 regarding the operation of the battery unit according to the present embodiment.

In an initial state in which a given battery unit is not connected to the power supply line, the switching element 132 is turned on, and the switching element 131 is turned off. In this state, the resistance path 133 having a high resistance value is selected, in the same way as in the first embodiment described above.

With the control unit 135, when the battery unit is connected to the power supply line, the power supply line voltage detection unit 1352 detects the electric potential at the power supply line (Step S310). Furthermore, the cell group voltage detection unit 1351 detects the electric potential at the battery cell group 136 (Step S320). Moreover, the voltage difference detection unit 1353 detects the voltage difference between the voltage value detected by the cell group voltage detection unit 1351 and the voltage value detected by the power supply line voltage detection unit 1352 (Step S330).

Next, the comparator 1394 compares the voltage difference thus detected by the voltage difference detection unit 1353 with a predetermined voltage difference stored in the memory 1395. The comparator 1394 outputs a comparison result signal, which indicates the comparison result, to the switching element control unit 1396.

Upon receiving the comparison result signal, the switching element control unit 1396 outputs a gate signal to the switching element 131 so as to turn on the switching element 131 until the voltage difference thus detected reaches the predetermined voltage difference. In this state, the battery cell group 136 is connected to the power supply line via the resistance path 133 (Step S340).

As described above, when the supply of electric power from the power supply source 110 is suspended, the present embodiment allows a given battery unit to be connected as desired to the power supply line while protecting its circuit elements from an overcurrent that can occur in a case in which, in a maintenance step or the like, at least one battery unit is detached from multiple battery units connected in parallel to the power supply line, and the battery unit thus detached is connected again to the power supply line.

It should be noted that the operation of such a battery unit may be recorded on a recording medium that is readable by a computer system. Also, an arrangement may be made so as to instruct the battery unit to read out a computer program recorded on the recording medium, and to execute the computer program thus read out, thereby providing the operation of the battery unit according to the present invention. Examples of such a computer system described above include an operating system (OS), and a hardware system such as a peripheral device or the like.

In a case in which the "computer system" employs the WWW (World Wide Web) system, such a computer system includes a website providing environment (or website display environment). Also, the aforementioned computer program may be transmitted from a computer system storing the computer program in a storage device thereof or the like to another computer system via a transmission medium or otherwise via transmission waves that propagates through a transmission medium. Here, the "transmission medium" configured to transmit a computer program represents a medium having a function for transmitting information, examples of which include a network (communication network) such as the Internet etc., and a communication link (communication line) such as a telephone line etc.

Also, the aforementioned computer program may be configured to provide a part of the aforementioned functions. Also, the aforementioned computer program may be configured to provide the aforementioned functions in the form of a combination with a program that has already been recorded on the computer system. That is to say, the aforementioned computer program may be configured as a differential file (differential program).

Detailed description has been made regarding the embodiments of the present invention with reference to the drawings. However, a specific configuration thereof is not restricted to such embodiments. Rather, the present invention encompasses various kinds of design changes and the like without departing from the technical scope of the present invention.

REFERENCE SIGNS LIST 110 power supply source, 120 rectifier, 130A electricity storage unit, 130B electricity storage unit, 130C electricity storage unit, 130D electricity storage unit, 131 switching element, 132 switching element, 133 resistance path, 134 normal path, 135 control unit, 136 battery cell group, 137 switching element, 138 second resistance path, 139 control unit, 150 load, floating capacitance 160, 1351 cell group voltage detection unit, 1352 power supply line voltage detection unit, 1353 voltage difference detection unit, 1354 comparison unit, 1355 storage unit, 1356 switching element control unit, 1391 comparison unit, 1392 storage unit, 1393 switching element control unit, 1394 comparison unit, 1395 storage unit, and 1396 switching element control unit.

The invention claimed is:

1. A battery unit that can be connected to a power supply line via an external terminal, so as to allow the battery unit to be charged and discharged via the power supply line thus connected, the battery unit comprising:
   a battery cell group comprising a plurality of battery cells;
   a control unit that detects an electric potential at the power supply line and an electric potential at the battery cell group, and that outputs a control signal based on a voltage difference between the power supply line and the battery cell group; and
   a switching unit that is arranged between the power supply line and the battery cell group, and that switches a path, according to the control signal, between a normal path and a resistance path having a resistance value that is higher than that of the normal path and connected in parallel with the normal path, so as to control a current that flows between the power supply line and the battery cell group;
   wherein the control unit outputs the control signal such that, when the battery unit is connected to the power supply line via the external terminal, the battery cell group is connected to the power supply line via the resistance path until the voltage difference becomes a predetermined voltage difference, and such that, when the voltage difference becomes the predetermined voltage difference, the battery cell group is connected to the power supply line via the normal path.

2. The battery unit according to claim 1, wherein the switching unit comprises:
   a first switch provided to the normal path so as to switch a state of connection of the power supply line and the battery cell group according to the control signal; and a second switch provided to the resistance path so as to switch a state of connection of the power supply line and the battery cell group according to the control signal, and wherein, when electric power is not supplied to the battery unit, the control unit sets the first switch and the second switch to an open-circuit state so as to disconnect the external terminal from the battery cell group.

3. The battery unit according to claim 1, wherein, when electric power is supplied to the battery unit, the control unit checks a change in a voltage difference between both ends of each of the first switch and the second switch between a state in which the first switch and the second switch are each turned off and a state in which the first switch and the second switch are each turned on.

4. The battery unit according to claim 1, wherein, when the battery unit is not connected to the power supply line via the external terminal, the control unit outputs the control signal so as to connect the battery cell group to the external terminal via the resistance path.

5. The battery unit according to claim 1, wherein the resistance path comprises:
   a first resistance path including a first protection resistor; and
   a second resistance path including a second protection resistor having a higher resistance than that of the first protection resistor,
   wherein, when the battery unit is connected to the power supply line via the external terminal, the control unit outputs the control signal such that the battery cell group is connected to the power supply line via the second resistance path until the voltage difference becomes a predetermined first voltage difference, and such that the battery cell group is connected to the power supply line via the first resistance path until the voltage difference becomes a predetermined second voltage difference that is smaller than the first voltage difference.

6. The battery unit according to claim 1, wherein the battery unit is configured to be connected to the power supply line when a supply of electric power to the power supply line is suspended.

7. An overcurrent control method employed in a battery unit that comprises a battery cell group, a switching unit arranged between a power supply line and the battery cell group, and a control unit, and that can be connected to the power supply line via an external terminal so as to allow the battery unit to be charged and discharged via the power supply line thus connected, wherein, when the battery unit is connected to the power supply line via the external terminal, the overcurrent control method is performed, wherein the overcurrent control method comprises:
a first step in which the control unit detects an electric potential at the power supply line;
a second step in which the control unit detects an electric potential at the battery cell group;
a third step in which the control unit outputs a control signal based on a voltage difference detected in the first step and the second step; and
a fourth step in which the switching unit switches a path, according to the control signal, between a normal path and a resistance path having a higher resistance value than that of the normal path and connected in parallel with the normal path, so as to control a current that flows between the power supply line and the battery cell group,
and wherein, in the third step, the control unit outputs the control signal such that the battery cell group is connected to the power supply line via the resistance path until the voltage difference becomes a predetermined voltage difference, and such that, when the voltage difference becomes the predetermined voltage difference, the battery cell group is connected to the power supply line via the normal path.

8. A computer program product including a non-transitory computer readable medium storing a program which, when executed by a computer, causes the computer to perform an overcurrent control method employed in a battery unit that comprises a battery cell group, a switching unit arranged between a power supply line and the battery cell group, and a control unit, and that can be connected to the power supply line via an external terminal so as to allow the battery unit to be charged and discharged via the power supply line thus connected, wherein, when the battery unit is connected to the power supply line via the external terminal, the computer program instructs a computer to execute the overcurrent control method, wherein the overcurrent control method comprises:
a first step in which the control unit detects an electric potential at the power supply line;
a second step in which the control unit detects an electric potential at the battery cell group;
a third step in which the control unit outputs a control signal based on a voltage difference detected in the first step and the second step; and
a fourth step in which the switching unit switches a path, according to the control signal, between a normal path and a resistance path having a higher resistance value than that of the normal path and connected in parallel with the normal path, so as to control a current that flows between the power supply line and the battery cell group,
and wherein, in the third step, the control unit outputs the control signal such that the battery cell group is connected to the power supply line via the resistance path until the voltage difference becomes a predetermined voltage difference, and such that, when the voltage difference becomes the predetermined voltage difference, the battery cell group is connected to the power supply line via the normal path.

* * * * *